Aug. 12, 1958     C. F. KRAMER     2,847,247
MOTOR VEHICLE BODY CONSTRUCTION
Filed July 16, 1956
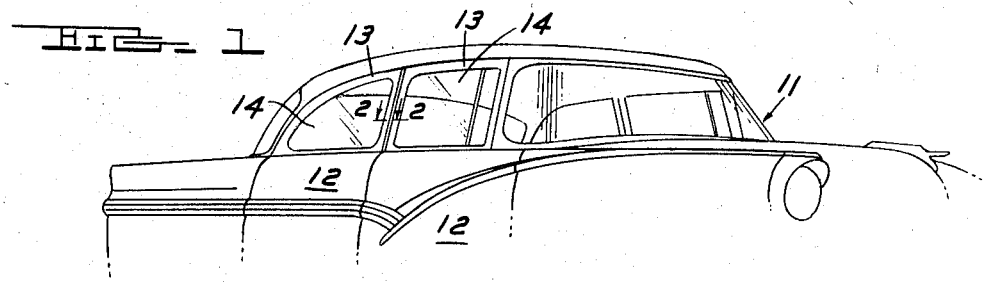
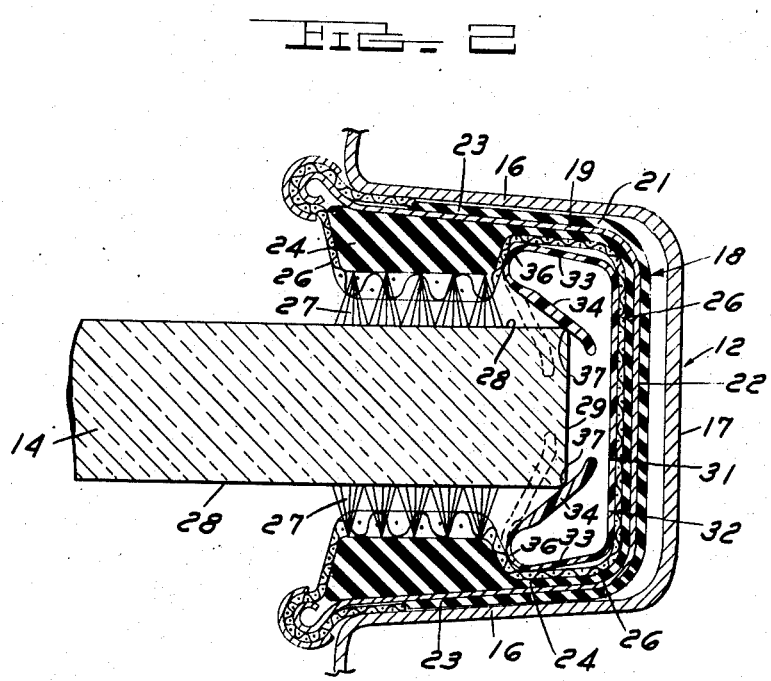
C. F. KRAMER
INVENTOR.
BY    E. C. McRAE
J. R. FAULKNER
T. H. OSTER
ATTORNEYS United States Patent Office
2,847,247
Patented Aug. 12, 1958

2,847,247
MOTOR VEHICLE BODY CONSTRUCTION
Clarence F. Kramer, Birmingham, Mich., assignor to Ford Motor Company, Dearborn, Mich., a corporation of Delaware Application July 16, 1956, Serial No. 598,068
7 Claims. (Cl. 296—44.5)

This invention relates generally to a motor vehicle body construction, and has particular reference to a glass run assembly for guiding and supporting the window glass of a motor vehicle body.

It is conventional practice in motor vehicle body construction to mount a glass run assembly within the window frame, with the glass run assembly being generally U-shaped in cross section and having tufted textile material or padding on both side legs of the glass run channel as well as on the inner side of the base of the channel. This material engages the opposite sides and the marginal edge of the window glass to guide and support the latter.

In the present invention the textile material or padding in the base of the glass run channel is replaced by a resilient strip flexibly engaging the marginal edge of the window glass. In one embodiment the resilient strip may be a formed strip of nylon generally U-shaped in cross section and having inturned legs flexibly engaging the glass. This construction provides an automatic take-up means accommodating deviations in the dimensions of the window glass, glass run assembly and window frame. Proper guiding, supporting and sealing of the window is thus achieved despite manufacturing variations in the various parts.

Other objects and advantages of this invention will be made more apparent as this description proceeds, particularly when considered in connection with the accompanying drawings, wherein:

Figure 1 is a fragmentary perspective view of a motor vehicle body incorporating the present invention.

Figure 2 is an enlarged cross sectional view taken on the plane indicated by the line 2—2 of Figure 1.

Referring now to the drawings, the reference character 11 indicates generally a motor vehicle body having doors 12 supporting window frames 13 forming guiding and supporting means for window glass 14.

Referring now to Figure 2, the window frame 14 is a one-piece formed sheet metal frame generally U-shaped in cross section and having side flanges 16 and a base 17. The channel shaped window frame 14 receives and supports a glass run assembly 18 extending continuously along the sides and top of the window opening.

The glass run assembly has a metal core 19, the exterior side of which is covered by a cotton adhesive rubberized tape cover 21. The core 19 and the cover 21 are generally U-shaped in cross section and form a base 22 and opposite side flanges 23. A rubberized material 24 is secured to the inner side of the U-shaped metal core 19 and supports a textile lining 26. Oppositely directed pile 27 extends from the side portions of the textile lining 26 to engage the opposite sides 28 of the window glass 14 to guide and support the latter.

As thus far described the glass run assembly 18 is conventional in construction. Usually, however, a textile material or padding is secured to the base 22 of the channel shaped glass run to engage and form a guide for the marginal edge portion 29 of the window glass 14.

In lieu of the conventional padding along the base of the glass run, however, the present invention utilizes a formed strip 31 preferably of nylon or other material having the requisite characteristics. The strip 31 has a flat base 32 directly engaging the base 22 of the glass run assembly 18 and suitably secured thereto. The strip may be attached to the base of the glass run by a suitable adhesive, or if desired may be secured thereto by fastening means such as rivets or the like. The strip 31 is formed with integral side legs 33 angularly related with respect to the base and extending generally along the adjacent portions of the textile lining 26 of the glass run.

Integrally formed with the side legs 33 of the nylon strip 31 are a pair of inturned flanges 34 connected to the legs 33 by means of arcuate intermediate portions 36. The construction is such that the inturned flanges 34 resiliently engage the corners 37 of the window glass 14.

The free untensioned positions of the inturned flanges 34 of the nylon strip 31 are shown in dotted lines in Figure 2, and it will be apparent that the engagement of the window glass with the inturned flanges 34 results in bending the latter about the arcuate interconnecting portions 36.

It will be seen that the inturned flanges 34 automatically compensate for manufacturing variations in the relationship between the glass run assembly and the window glass. Thus regardless of the dimensional variations of the particular assembly, the resilient flanges of the nylon strip will properly guide and support the window glass throughout its opening and closing movements. The bearing properties of the nylon strip contribute to smooth operation of the window, and the nylon strip is impervious to moisture and consequently maintains its position and resilient properties.

It will be understood that the invention is not to be limited to the exact construction shown and described, but that various changes and modifications may be made without departing from the spirit and scope of the invention, as defined in the appended claims.

What is claimed is:

1. A glass run assembly for a motor vehicle window glass comprising a generally U-shaped channel having a base and opposed side flanges embracing the marginal edge portion of said window glass, means carried by said side flanges adapted to engage the opposite faces of said window glass, and a resilient plastic member mounted adjacent the base of said channel and having a flexible portion thereof engageable with a marginal edge of said window glass, the flexible portion of said member being distorted from its free position in a direction toward the base of said channel when in engagement with said window glass.

2. A glass run assembly for a motor vehicle window glass comprising a generally U-shaped metal core having a base and a pair of integral opposed side flanges embracing therebetween the edge portion of said window glass, a resilient covering adjacent the inner surface of the base and side flanges of said core, a layer of textile material adjacent the inner surface of said covering, means carried by said textile layer adapted to engage the opposite faces of said window glass, and a plastic strip positioned within said U-shaped metal core adjacent the base thereof, said plastic strip having a continuous flange flexibly connected to the base of said strip and adapted to resiliently engage the marginal edge of said window glass.

3. The structure defined by claim 2 which is further characterized in that said plastic strip has a base portion arranged in juxtaposition to the base of said core, integral side flanges arranged in juxtaposition to the side flanges of said core, and inturned converging marginal flanges integrally connected to the side flanges of said strip by arcuate interconnecting portions.

4. A glass run assembly for a motor vehicle window glass comprising a generally U-shaped channel having a base and opposed side flanges embracing the marginal edge portion of said window glass, means carried by said side flanges adapted to engage the opposite faces of said window glass, a resilient plastic member generally channel shaped in cross section with its base portion secured to the base of said first mentioned channel and with its opposite side flanges merging into integral inturned flanges engageable with the marginal edge of said window glass.

5. The structure defined by claim 4 which is further characterized in that said integral inturned flanges of the said plastic member converge toward the base of said member and resiliently contact the corners of the marginal edge of said window glass.

6. A glass run assembly for a motor vehicle window glass comprising a generally U-shaped channel having a base and opposed side flanges embracing the marginal edge portion of said window glass, and a separate resilient plastic member mounted within said U-shaped channel, said resilient plastic member having a base secured to said channel and a flange integrally connected to said base and angularly related to said base and resiliently engaging the marginal edge of said window glass for resiliently urging said window glass in a direction away from the base of said channel.

7. A glass run assembly for a motor vehicle window glass comprising a generally U-shaped channel having a base and opposed side flanges embracing the marginal edge portion of said window glass, means carried by said side flanges adapted to engage the opposite faces of said window glass, and a generally U-shaped resilient plastic member positioned within said first mentioned channel and having its base portion secured to the base of said first mentioned channel, said resilient plastic member having side flanges and inturned marginal flanges integrally connected to said side flanges and resiliently engaging the corners of the marginal edge of said window glass.

References Cited in the file of this patent

FOREIGN PATENTS

| | | |
|---|---|---|
| 596,954 | Great Britain | June 15, 1945 |
| 259,999 | Switzerland | July 1, 1949 |
| 464,290 | Italy | June 26, 1951 |
| 704,459 | Great Britain | Feb. 24, 1954 |